US012148318B1

(12) United States Patent
Lambert et al.

(10) Patent No.: US 12,148,318 B1
(45) Date of Patent: Nov. 19, 2024

(54) DATA HANDLING USING EDGE DECISION PROCESSING

(71) Applicant: Lytx, Inc., San Diego, CA (US)

(72) Inventors: Daniel Lambert, Carlsbad, CA (US); Petra Guiney, Solana Beach, CA (US)

(73) Assignee: Lytx, Inc., San Diego, CA (US)

( * ) Notice: Subject to any disclaimer, the term of this patent is extended or adjusted under 35 U.S.C. 154(b) by 1018 days.

(21) Appl. No.: 16/919,681

(22) Filed: Jul. 2, 2020

(51) Int. Cl.
*G09B 19/14* (2006.01)
*B60K 35/00* (2006.01)
*G06Q 10/0639* (2023.01)
*G06Q 30/018* (2023.01)
*G06V 20/59* (2022.01)
*G07C 5/00* (2006.01)
*G07C 5/08* (2006.01)
*G09B 19/16* (2006.01)
*H04L 51/224* (2022.01)
*B60K 35/22* (2024.01)
*B60K 35/28* (2024.01)
*G06Q 50/40* (2024.01)

(52) U.S. Cl.
CPC .............. *G09B 19/14* (2013.01); *B60K 35/00* (2013.01); *G06Q 10/06398* (2013.01); *G06Q 30/018* (2013.01); *G06V 20/597* (2022.01); *G07C 5/008* (2013.01); *G07C 5/0808* (2013.01); *G07C 5/0816* (2013.01); *G09B 19/167* (2013.01); *H04L 51/224* (2022.05); *B60K 35/22* (2024.01); *B60K 35/28* (2024.01); *B60K 2360/178* (2024.01); *G06Q 50/40* (2024.01)

(58) Field of Classification Search
CPC ...... G09B 19/14; G09B 19/167; G07C 5/008; G07C 5/0808; G07C 5/0816
See application file for complete search history.

(56) References Cited

U.S. PATENT DOCUMENTS

| 9,424,696 | B2* | 8/2016 | McQuade | G09B 9/052 |
| 9,925,987 | B1* | 3/2018 | Nguyen | G08G 1/0129 |
| 10,035,514 | B1* | 7/2018 | Lambert | B60W 40/09 |
| 2011/0213526 | A1* | 9/2011 | Giles | G07C 5/085 |
| | | | | 701/33.4 |
| 2013/0345927 | A1* | 12/2013 | Cook | G07C 5/0808 |
| | | | | 701/33.4 |
| 2015/0175168 | A1* | 6/2015 | Hoye | B60W 40/08 |
| | | | | 434/64 |
| 2015/0186714 | A1* | 7/2015 | Ren | G06V 40/103 |
| | | | | 348/77 |
| 2016/0140872 | A1* | 5/2016 | Palmer | G09B 19/167 |
| | | | | 434/65 |
| 2018/0005076 | A1* | 1/2018 | Jain | G08B 21/182 |
| 2018/0122259 | A1* | 5/2018 | Arquero | G09B 19/167 |

(Continued)

*Primary Examiner* — Jay Trent Liddle
*Assistant Examiner* — Alyssa N Brandley
(74) *Attorney, Agent, or Firm* — Van Pelt, Yi & James LLP

(57) ABSTRACT

A system for data escalation includes an interface and a processor. The interface is configured to receive sensor data. The processor is configured to determine whether the sensor data indicates an infraction by a driver; in response to the sensor data indicating the infraction by the driver, determine whether the sensor data is to be escalated; in response to determining that the sensor data is to be escalated, indicate that the sensor data is to be escalated to a server; and in response to determining that the sensor data is not to be escalated, indicate the infraction to the driver.

20 Claims, 17 Drawing Sheets

(56) References Cited

U.S. PATENT DOCUMENTS

| | | | |
|---|---|---|---|
| 2018/0297518 A1* | 10/2018 | Armitage | G07C 5/008 |
| 2019/0213406 A1* | 7/2019 | Porikli | G06V 20/597 |
| 2020/0074492 A1* | 3/2020 | Scholl | G06Q 50/30 |

* cited by examiner

1200

| Case: | Details: |
|---|---|
| Self-managed risk | In the event that:<br><br>- Client has self-managed option enabled<br>- Driver risk score is less than risk threshold<br>- Risk identified is less than escalation threshold<br><br>Escalation threshold can be implemented as:<br><br>- Overall driver score, comprising the sum of risk values associated with driver behaviors. Risk values can be evenly weighted or include weights that decay with time.<br><br>- Incident driver score, comprising the score value of an incident including all identifiable risk conditions.<br><br>- Condition comprising an automatic escalation in the event the condition is satisfied. |
| Risk is not self-managed | In the event that:<br><br>- Client does not have self-managed option enabled.<br><br>- Driver score is greater than risk threshold.<br><br>- Identified risk exceeds self-managed risk.<br><br>- Automatic escalation condition is satisfied. |

Fig. 12

| Data Handling: | Data Management: 1300 |
|---|---|
| Store Locally: tagged as self-managed | - Maintain self-managed data at vehicle<br><br>- Allows driver to self-manage based on system feedback<br><br>-Provides information to escalate to coach/ manager if driver behavior exceeds self-manage risk threshold<br><br>-Incident data expires at appropriate interval if no escalation |
| Store in Cloud: tagged as self-managed | Same as Store Locally except:<br><br>- Data is moved to the cloud with self-manage tags to support access control rights limited to driver until escalation |

Fig. 13

| Data Types: | Examples: 1400 |
|---|---|
| Incident Meta Data | - Incident type<br><br>- Incident duration<br><br>- Driver feedback type<br><br>- Driver feedback count<br><br>- Driver response |
| Incident Video Data | - Incident video footage<br><br>- Video footage assocaited with a predefined incident<br><br>- Video comprising part of a continual recording indexed by incident meta data |

Fig. 14

| Self-Managed Data Accessor: | Access Details: 1500 |
|---|---|
| Driver | - Data access provided as available<br><br>- Data is read-only<br><br>- Driver can flag data for deletion in the event they feel it is inaccurate |
| Coach or Manager | - No standard access provided<br><br>- Access available if data escalated or granted by driver<br><br>- Condition based access permitted<br><br>    - In the event of escalation conditions that weren't automatically invoked<br><br>    - Access provided to driver infractions flagged for deletion |

| Risk Type: | Self-Manage Situation: | Escalation Criteria: |
|---|---|---|
| Distraction - Cellphone | - Driver is alerted 4 seconds after initial detection<br><br>- Driver is re-alerted 6 seconds after initial detection | - Re-alert or continued behavior after ≥ 6 seconds<br><br>-Driver has > 1 incident per drive |
| Distraction - Eating/Drinking | - Driver is alerted 10 seconds after initial detection<br><br>- Driver is re-alerted 12 seconds after initial detection | - Re-alert or continued behavior after ≥ 12 seconds<br><br>-Driver has > 1 incident per drive |
| Distraction - Smoking | - Driver is alerted 4 seconds after initial detection<br><br>- Driver is re-alerted 10 seconds after initial detection | - Re-alert or continued behavior after ≥ 10 seconds<br><br>-Driver has > 1 incident per drive |
| Distraction - General | - Driver is alerted 4 seconds after initial detection<br><br>- Driver is re-alerted 6 seconds after initial detection | - Re-alert or continued behavior after ≥ 6 seconds<br><br>-Driver has > 1 incident per drive |
| Fatigue | - Driver is alerted 4 seconds after initial detection<br><br>- Driver is re-alerted 6 seconds after initial detection | - Re-alert or continued behavior after ≥ 6 seconds<br><br>-Driver has > 1 incident per rolling 7 day window |
| No Seat Belt | - Driver is alerted 30 seconds after initial detection<br><br>- Driver is re-alerted 40 seconds after initial detection | - Re-alert or continued behavior after ≥ 40 seconds<br><br>-Driver has > 1 incident per rolling 7 day window |
| Following Too Close | - Driver is alerted 4 seconds after initial detection<br><br>- Driver is re-alerted 6 seconds after initial detection | - Re-alert or continued behavior after ≥ 6 seconds<br><br>-Driver has > 1 incident per drive |

Fig. 16

| Risk Type: | Self-Manage Situation: | Escalation Criteria: |
|---|---|---|
| Lane Keeping Violation | - Driver is alerted after 2 or more lane departures in 10 seconds | - After > 2 violations in rolling 7 day window |
| Posted Speed Limit Infraction | - Driver is alerted 4 seconds after initial detection<br><br>- Driver is re-alerted 10 seconds after initial detection | - Re-alert or continued behavior after ≥ 10 seconds<br><br>-Driver has > 1 incident per drive |
| Company Policy Speed Limit Infraction | - Driver is alerted 4 seconds after initial detection<br><br>- Driver is re-alerted 10 seconds after initial detection | - Re-alert or continued behavior after ≥ 10 seconds<br><br>-Driver has > 1 incident per drive |
| Driving Too Fast For Conditions | - Driver is alerted 4 seconds after initial detection<br><br>- Driver is re-alerted 10 seconds after initial detection | - Re-alert or continued behavior after ≥ 10 seconds<br><br>-Driver has > 1 incident per drive |
| Rolling Stop Violation | - Driver is alerted after detection of a rolling stop violation | - After > 1 violation in rolling 7 day window |
| Hard Brake Violation | - Driver is alerted after detection of a hard brake violation | - After > 1 violation in rolling 7 day window |
| Hard Accelerate Violation | - Driver is alerted after detection of a hard accelerate violation | - After > 1 violation in rolling 7 day window |
| Hard Corner Violation | - Driver is alerted after detection of a hard corner violation | - After > 1 violation in rolling 7 day window |
| Collision | - Never self-managed | - Immediately |
| Roll Stability | - Never self-managed | - Immediately |

Fig. 17

DATA HANDLING USING EDGE DECISION PROCESSING

BACKGROUND OF THE INVENTION

Modern vehicles (e.g., airplanes, boats, trains, cars, trucks, etc.) can include a vehicle event recorder in order to better understand the timeline of an anomalous event (e.g., an accident). A vehicle event recorder mounted on a vehicle typically includes a set of sensors—for example, video recorders, audio recorders, accelerometers, gyroscopes, vehicle state sensors, global positioning system (GPS), etc., that report data, which is used to determine the occurrence of an anomalous event (e.g., a sudden stop, a hard maneuver, a collision, etc.) or a bad driver behavior (e.g., eating while driving, talking on a cell phone while driving, smoking while driving, etc.). Bad driver behavior can be escalated to a manager for coaching, allowing the manager to correct the driver behavior. However, sending all bad driver behavior data to the manager for coaching creates a problem as it requires a significant amount of transmission bandwidth and/or storage and also can reduce trust between the driver and management, as a driver can become uncomfortable with the feeling of being watched constantly.

BRIEF DESCRIPTION OF THE DRAWINGS

Various embodiments of the invention are disclosed in the following detailed description and the accompanying drawings.

FIG. 12 is a diagram illustrating an embodiment of self-managed risk details.

FIG. 13 is a diagram illustrating an embodiment of self-managed data management.

FIG. 14 is a diagram illustrating an embodiment of data examples.

FIG. 15 is a diagram illustrating an embodiment of data access examples.

FIG. 16 is a diagram illustrating an embodiment of a self-managed data situation and escalation criteria for varied risk types.

FIG. 17 is a diagram illustrating an embodiment of a self-managed data situation and escalation criteria for varied risk types.

DETAILED DESCRIPTION

Figure 1:
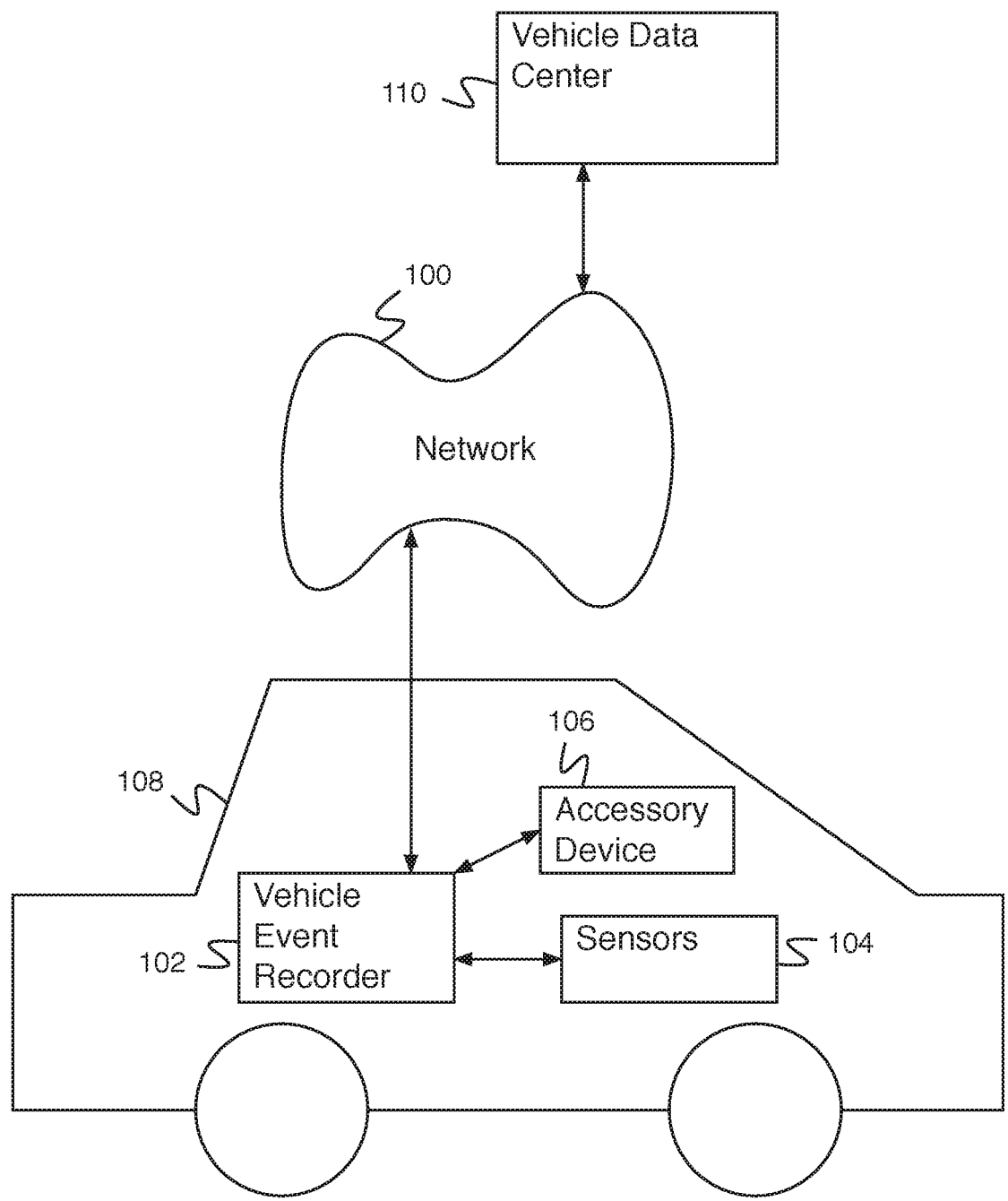
FIG. 1 is a block diagram illustrating an embodiment of a system including a vehicle event recorder.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for data handling comprises an interface configured to receive sensor data, and a processor configured to determine whether the sensor data indicates an infraction by a driver, in response to the sensor data indicating the infraction by the driver, determine whether the sensor data is to be escalated, in response to determining that the sensor data is to be escalated, indicate that the sensor data is to be escalated to a server, and in response to determining that the sensor data is not to be escalated, indicate the infraction to the driver.

A system for data handling comprises a system for progressive coaching. For example, the system for progressive coaching comprises a system for receiving and processing sensor data. In the event processing the sensor data indicates that the driver performed a coachable behavior, a decision is made regarding whether to have the driver self-coach or to escalate the data to a manager. Having the driver self-coach comprises providing the driver with an indication of the coachable behavior, having the driver agree to a statement acknowledging the behavior needs correcting, having the driver complete a coaching exercise, etc. In some embodiments, the system is configured such that when coachable driver behavior is rectified through self-coaching, sensor data associated with the coachable driver behavior is not transferred to a manager-accessible data storage system. For example, the data is stored on the vehicle event recorder and not transferred to a server or the cloud, the data is stored in a data storage region indicated for access only by the driver, etc. The decision regarding whether to have the driver self-coach or to escalate the data to a manager is based on an escalation state based at least in part on a driver risk score. For example, the driver risk score is increased in the event the driver performs a risky behavior, in the event the driver repeats a risky behavior, in the event the driver repeats a risky behavior within a predetermined time period, or in the event the driver continues to perform a risky behavior, and the driver risk score is lowered in the event the driver has not performed a risky behavior in greater than a threshold period of time. The escalation state is additionally based at least in part on an individual risky behavior (e.g., whether a single behavior is risky enough to warrant coaching by a manager), and on evaluation of a no tolerance behavior (e.g., certain behaviors comprise no tolerance behaviors and are escalated immediately). The driver can have confidence that in the event that they successfully self-coach (e.g., in the event that the driver corrects the coachable behavior and does not repeat it or does not repeat it a threshold number of times), the data will remain with them (e.g., the data will not be transferred and/or stored or, in some cases, the data is removed). In the event the driver does not successfully self-coach (e.g., they repeat the coachable behavior such that the driver risk score crosses a driver risk score threshold), new coachable behaviors are immediately escalated and the data shared with the manager for coaching. In some embodiments, in the event that the driver does not successfully self-coach, data associated with previous self-coaching events is provided to the manager for coaching.

In some embodiments, the system for data escalation improves the computer system by protecting data from being escalated to a manager in the event it represents a basic self-coachable behavior, empowering the driver to improve his behavior without intervention by the manager, while still monitoring the driver for repeated or worsening behavior and storing the data in the event it is needed for future review by the manager. This improves efficiency and use of transmission bandwidth and storage for the system by only moving and/or storing data when necessary.

FIG. 1 is a block diagram illustrating an embodiment of a system including a vehicle event recorder. Vehicle event recorder 102 comprises a vehicle event recorder mounted in a vehicle (e.g., a car or truck). Vehicle event recorder 102 is in communication with vehicle sensors 104. Vehicle sensors 104 comprises a set of sensors—for example, one or more video recorders (e.g., one or more forward facing video recorders, one or more side facing video recorders, one or more rear facing video recorders, one or more interior video recorders, etc.), audio recorders (e.g., one or more exterior audio recorders, one or more interior audio recorders, etc.), accelerometers, gyroscopes, vehicle state sensors, proximity sensors (e.g., a front distance sensor, a side distance sensor, a rear distance sensor, etc.), advanced driver assistance system (ADAS) sensors, a GPS, outdoor temperature sensors, moisture sensors, line tracker sensors (e.g., laser line tracker sensors), a lane change sensor, etc. Vehicle state sensors comprise internal vehicle state sensors, for example a speedometer, an accelerator pedal sensor, a brake pedal sensor, an engine revolutions per minute (RPM) sensor, an engine temperature sensor, a headlight sensor, an airbag deployment sensor, driver and passenger seat weight sensors, an anti-locking brake sensor, traction control system sensors, drive wheel speed sensors, shocks sensors, an engine exhaust sensor, a gear position sensor, a cabin equipment operation sensor, an engine control unit (ECU) sensor, etc. Vehicle event recorder 102 comprises a system for receiving and processing sensor data. Processing sensor data comprises filtering data, identifying patterns in data, detecting events, etc. Vehicle event recorder 102 is additionally in communication with accessory device 106. Accessory device 106 comprises a device external to vehicle event recorder for displaying information and/or receiving information. For example, accessory device 106 comprises a flat panel display, a tablet computer, a smartphone, an audio output system, etc. vehicle event recorder 102 communicates with accessory device 106 via wired and/or wireless communications. For example, vehicle event recorder 102 communicates with accessory device 106 to provide sensor data, to provide an indication of a determination of risky behavior, to provide an indication of coaching, to provide an indication of data escalation, etc. Vehicle event recorder 102 is mounted on vehicle 108 in any appropriate location—for example, the chassis, the front grill, the dashboard, the rear-view mirror, the rear window or wall, the floor, etc. There are times when vehicle event recorder 102 comprises multiple units mounted in different locations within vehicle 106 instead of a single unit, particularly when there are space constraints for a given location (e.g., behind the rear view mirror) and more space is required to house electronic components. Vehicle event recorder 102 comprises a communications system for communicating with network 100. Network 100 comprises a network for communications. Network 100 comprises one or more of a wireless network, a wired network, a cellular network, a Code Division Multiple Access (CDMA) network, a Global System for Mobile Communication (GSM) network, a Long-Term Evolution (LTE) network, a Universal Mobile Telecommunications System (UMTS) network, a Worldwide Interoperability for Microwave Access (WiMAX) network, a Dedicated Short-Range Communications (DSRC) network, a Message Queueing for Telemetry Transport (MQTT) network, a local area network, a wide area network, the Internet, etc. There are instances when network 100 comprises multiple networks, for instance, multiple interconnected networks spanning different regions, networks operating at different times, overlaid networks with different access permissions, networks with different bandwidth, etc. Different networks comprising network 100 typically comprise different bandwidth cost (e.g., a wired network has a very low cost, a wireless Ethernet connection has a moderate cost, and a cellular data network has a high cost). In some embodiments, network 100 has a different cost at different times (e.g., a higher cost during the day and a lower cost at night). Vehicle event recorder 102 communicates with vehicle data server 110 via network 100. Vehicle data server 110 comprises a remote server for data storage, data analysis, data access by a coach and/or manager, data review by a human reviewer, etc.

As vehicle 108 travels, sensor data from sensors 104 is captured and analyzed by vehicle event recorder 102. For example, vehicle event recorder 102 comprises an interface configured to receive sensor data, and a processor configured to determine whether the sensor data indicates an infraction by a driver, in response to the sensor data indicating the infraction by the driver, determine whether the sensor data is to be escalated, in response to determining that the sensor data is to be escalated, indicate that the sensor data is to be escalated to a server, and in response to determining that the sensor data is not to be escalated, indicate the infraction to the driver.

Figure 2:
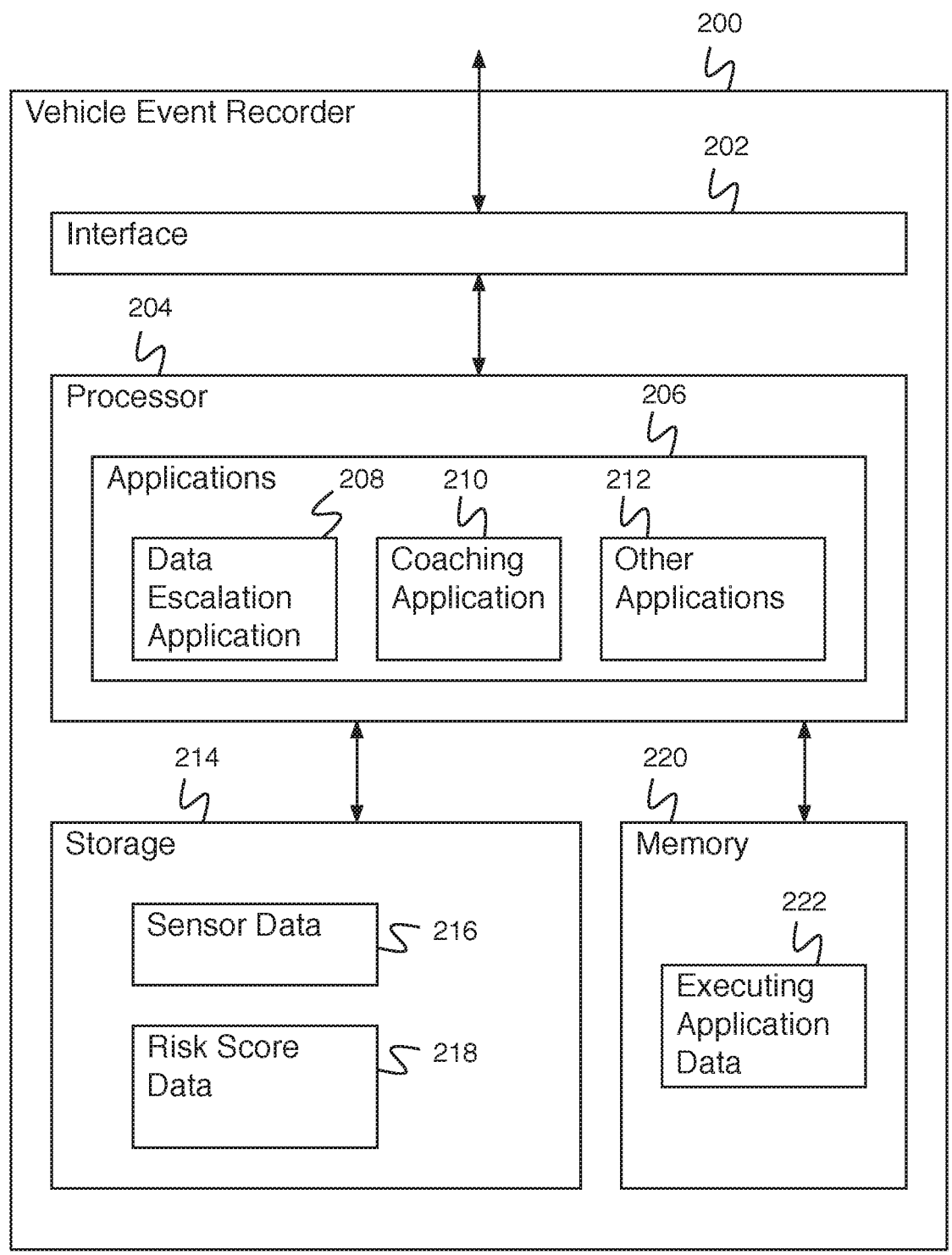
FIG. 2 is a block diagram illustrating an embodiment of a vehicle event recorder.

FIG. 2 is a block diagram illustrating an embodiment of a vehicle event recorder. In some embodiments, vehicle event recorder 200 comprises vehicle event recorder 102 of FIG. 1. In the example shown, vehicle event recorder 200 comprises interface 202. For example, interface 202 comprises an interface for receiving sensor data, receiving network communications, providing an indication of an anomalous event, providing sensor data, providing communications, providing coaching information, etc. Processor 204 comprises a processor for executing applications 206. Applications 206 comprise data escalation application 208, coaching application 210, and other applications 212. Data escalation application 208 comprises an application for determining self-coaching and/or data escalation in response to sensor data indicating a risky event. For example, data escalation application 208 comprises an application configured to determine whether sensor data indicates an infraction by a driver, in response to the sensor data indicating the infraction by the driver, determine whether the sensor data is to be escalated, in response to determining that the sensor data is to be escalated, indicate that the sensor data is to be escalated to a server, and in response to determining that the sensor data is not to be escalated, indicate the infraction to the driver. Coaching application 210 comprises an application for coaching a driver in response to a coachable event, for example, in response to data escalation application 208 determining to indicate an infraction to a driver. For example, coaching application 210 comprises an application for providing an indication to a driver, for interacting with the driver, for receiving an indication that the driver understands the coaching indication, etc. Other applications 212 comprise any other appropriate applications (e.g., a communications application, a data storage and retrieval application, a web browser application, a user interface application, a data analysis application, etc.). Storage 214 comprises sensor data 216 (e.g., sensor data received from a set of sensors) and risk score data 218 (e.g., data describing the estimated riskiness of a driver). In some embodiments, a portion of sensor data 216 comprises sensor data indicated for access only by a driver. In some embodiments, risk score data 218 comprises risk scores and data for calculating risk scores for a plurality of risk categories. Memory 220 comprises executing application data 222 comprising data associated with applications 206.

Figure 3:
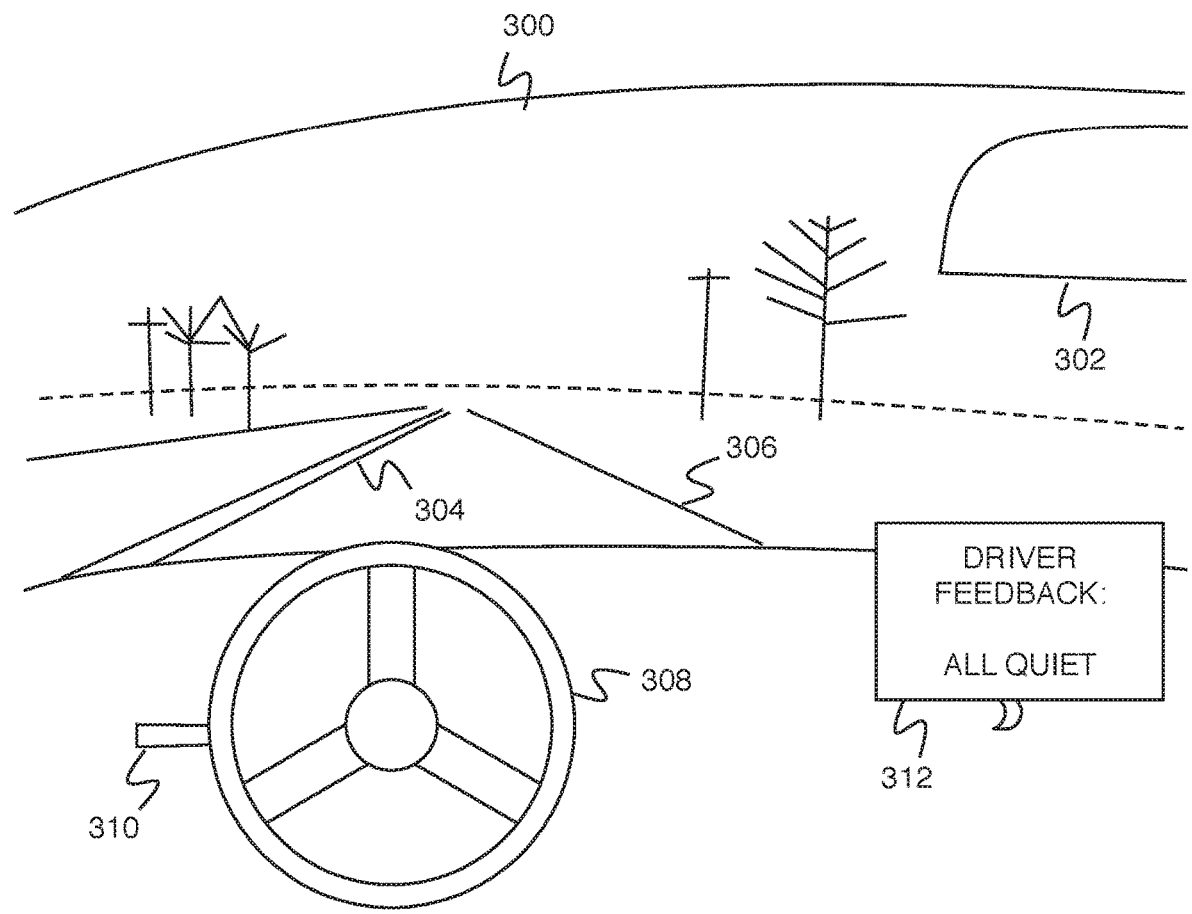
FIG. 3 is a diagram illustrating an embodiment of a vehicle cabin.

FIG. 3 is a diagram illustrating an embodiment of a vehicle cabin. In some embodiments, the diagram of FIG. 3 illustrates a driver view. In the example shown, a front view is seen via windshield 300 and a rear view is seen via rear view mirror 302. Through windshield 300 the driver is able to see the road, other cars, signs, stop lights, etc. Center line 304 and shoulder line 306 are visible to the driver through windshield 300. In some embodiments, center line 304 and shoulder line 306 comprise lane markers. In various embodiments, the driver uses the view of center line 304 and shoulder line 306 for determining a lane position, for guiding the path of a turn, for determining the legality of a lane change, or for any other appropriate purpose. In some embodiments, center line 304 and shoulder line 306 are visible to a forward facing camera (e.g., a forward facing camera communicating with sensor interface 202 of FIG. 2). In various embodiments, a forward facing camera uses a view of center line 304 and shoulder line 306 for determining a lane position, for determining whether the vehicle is turning, for determining a driver steadiness (e.g., whether the driver drives steadily or weaves within the lane), for determining a risky behavior (e.g., distractions—for example, cellphone, eating/drinking, smoking, general, fatigue, no seat belt, following too close, lane keeping violation, posted speed limit infraction, company policy speed limit infraction, driving too fast for conditions, rolling stop violation, running a light violation, hard brake violation, hard accelerate violation, hard corner violation, collision, roll stability, etc.), or for any other appropriate purpose. Rear view mirror 302 comprises a mirror for providing a driver a rear view behind the vehicle. A rear view is visible to a rearward facing camera. A cabin view (e.g., a view of the interior of the vehicle cabin) is visible to an inward facing camera. For example, an inward facing camera is mounted to rear view mirror 302 (e.g., attached to rear view mirror 302 for the purpose of getting a good view of the cabin). In some embodiments, an inward facing camera is used for capturing a driver image. For example, a driver image from an inward facing camera is used for identification of a risky behavior (e.g., eating, drinking, smoking, cell phone use, etc.). The vehicle cabin of FIG. 3 additionally comprises steering wheel 308 (e.g., for steering the vehicle) and turn signal indicator 310 (e.g., for indicating an intention to turn). Driver feedback device 312 comprises a driver feedback device for communicating with the driver. For example, driver feedback device 312 provides sensor data, coaching information, an indication of data escalation (e.g., an indication that risky behavior data is escalated to a manager), etc. In some embodiments, driver feedback device 312 additionally comprises an input device (e.g., a touch screen) for receiving information from a driver (e.g., a confirmation of coaching information, responses to a coaching quiz, etc.). In the example shown, driver feedback device 312 indicates an "all quiet" situation.

Figure 4:
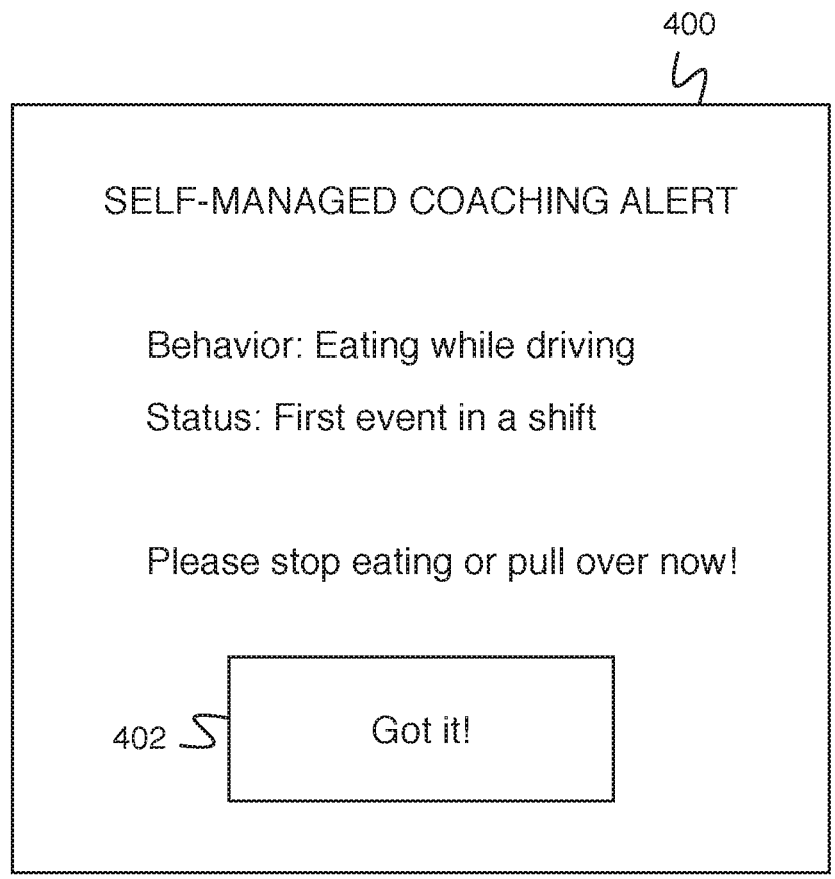
FIG. 4 is a diagram illustrating an embodiment of a self-managed coaching alert.

FIG. 4 is a diagram illustrating an embodiment of a self-managed coaching alert. For example, the self-managed coaching alert of FIG. 4 is provided to a driver using driver feedback device 312 of FIG. 3. In the example shown, self-managed coaching alert 400 indicates that the driver performed an eating while driving risky behavior for the first time in a shift. Because the risky behavior did not cause the driver to cross a risk threshold, the alert is self-managed, and the self-managed coaching alert is provided to the driver. The driver is prompted to confirm the coaching alert via an indication to "Got it!" button 402 and to stop eating or pull over immediately. In various embodiments, the indication comprises a screen touch, a verbal indication (e.g., saying "got it", "ok", "will do", etc.), or any other appropriate indication. In the event the driver continues eating while driving, the continued risky behavior will cause the risk threshold to be crossed and the alert will be escalated For example, after one or more periods of time detecting the risky behavior, after crossing a threshold number of risky events, after other events (e.g., hard braking, lane drifting, etc.) will cause the risk score to cross a threshold, etc. A self-managed coaching alert allows coaching of a driver without immediate escalation of minor risky behavior to the manager of the driver, allowing the driver the opportunity to independently self-coach.

Figure 5:
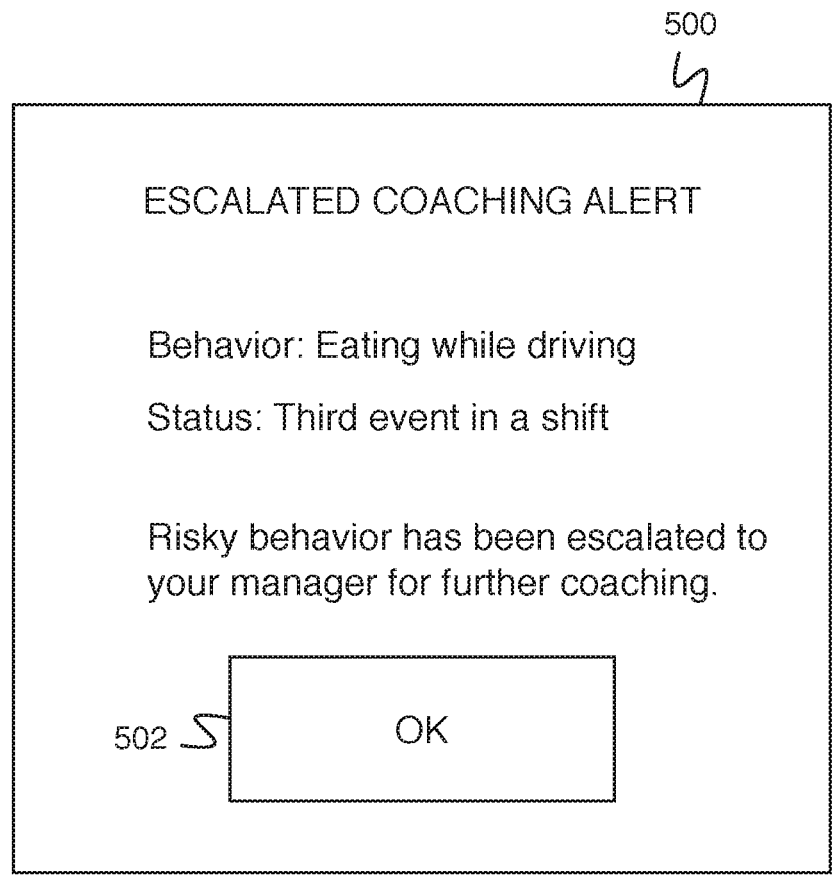
FIG. 5 is a diagram illustrating an embodiment of an escalated coaching alert.

FIG. 5 is a diagram illustrating an embodiment of an escalated coaching alert. For example, the escalated coaching alert of FIG. 5 is provided to a driver using driver feedback device 312 of FIG. 3. In the example shown, escalated coaching alert 500 indicates that the driver performed an eating while driver risky behavior for the third time in a shift. Because the risky behavior caused the driver to cross a risk threshold, the alert is escalated, and sensor data indicating the risky behavior is escalated to a server (e.g., the data is transmitted to a server and stored so that it can be provided to a manager). The driver is prompted to confirm the escalated alert via an indication to "OK" button 502. In various embodiments, the indication comprises a screen touch, a verbal indication (e.g., saying "got it", "ok", "will do", etc.), or any other appropriate indication. An escalated coaching alert allows coaching of a driver by a coach and/or manager in the event the driver does not independently self-coach.

Figure 6:
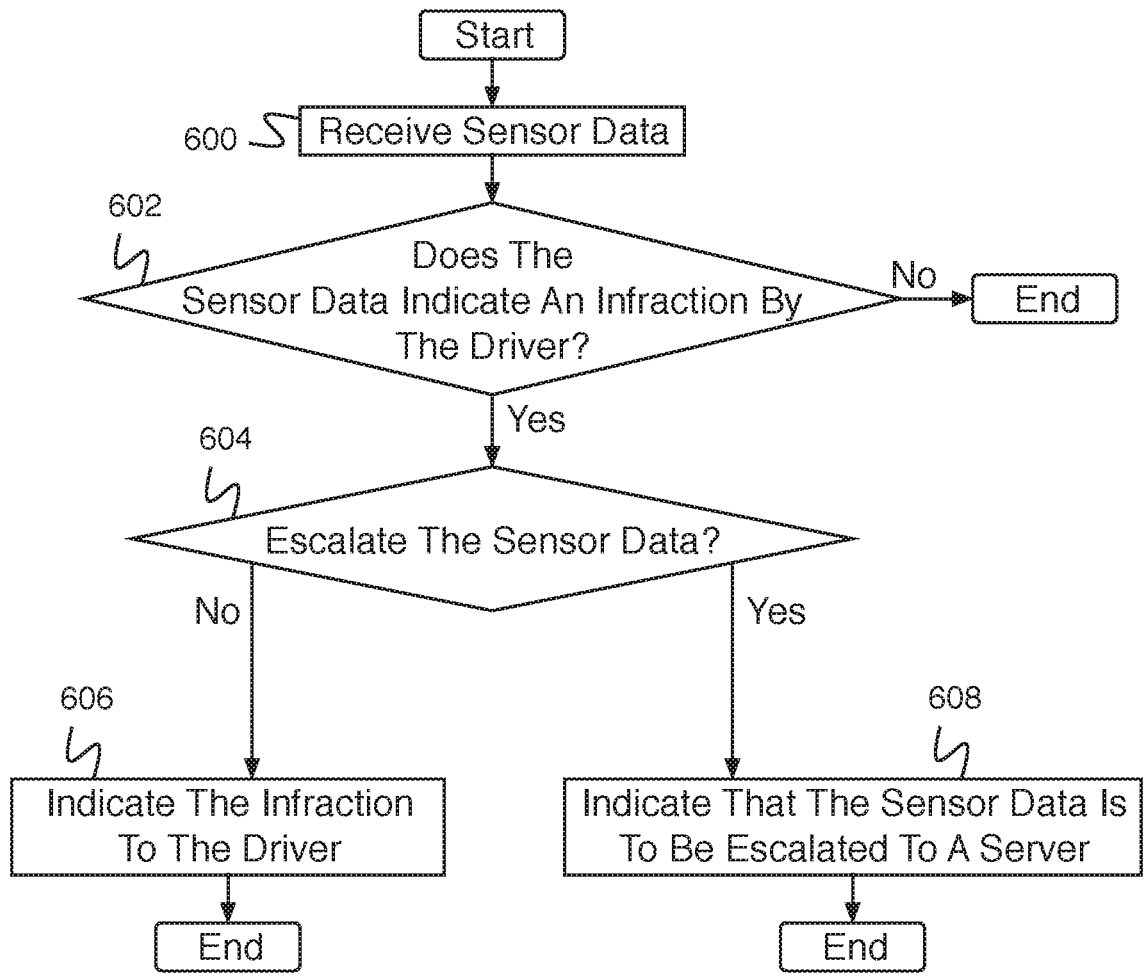
FIG. 6 is a flow diagram illustrating an embodiment of a process for data escalation.

FIG. 6 is a flow diagram illustrating an embodiment of a process for data escalation. In some embodiments, the process of FIG. 6 is executed by vehicle event recorder 102 of FIG. 1. In the example shown, in 600, sensor data is received. For example, sensor data comprises incident data (e.g., accelerometer data, gyro data, GPS data, etc.), incident video data, incident audio data, incident metadata (e.g., incident time, an incident ID, etc.), driver identifier data, etc. In 602, it is determined whether the sensor data indicates an infraction by the driver. For example whether the sensor data indicates a minor infraction, a major infraction, a repeated infraction, a continued infraction, a not tolerance infraction, etc. In the event it is determined that the sensor data does not indicate an infraction by the driver, the process ends. In the event the sensor data indicates an infraction by the driver, control passes to 604. In 604, it is determined whether to escalate the sensor data. For example, a determination of whether to escalate the sensor data is made using a stored escalation state based at least in part on a risk score. In the event it is determined not to escalate the sensor data, control passes to 606. In 606, the process indicates the infraction to the driver, and the process ends. In the event it is determined in 604 to escalate the sensor data, control passes to 608. In 608, the process indicates that the sensor data is to be escalated to a server, and the process ends.

Figure 7:
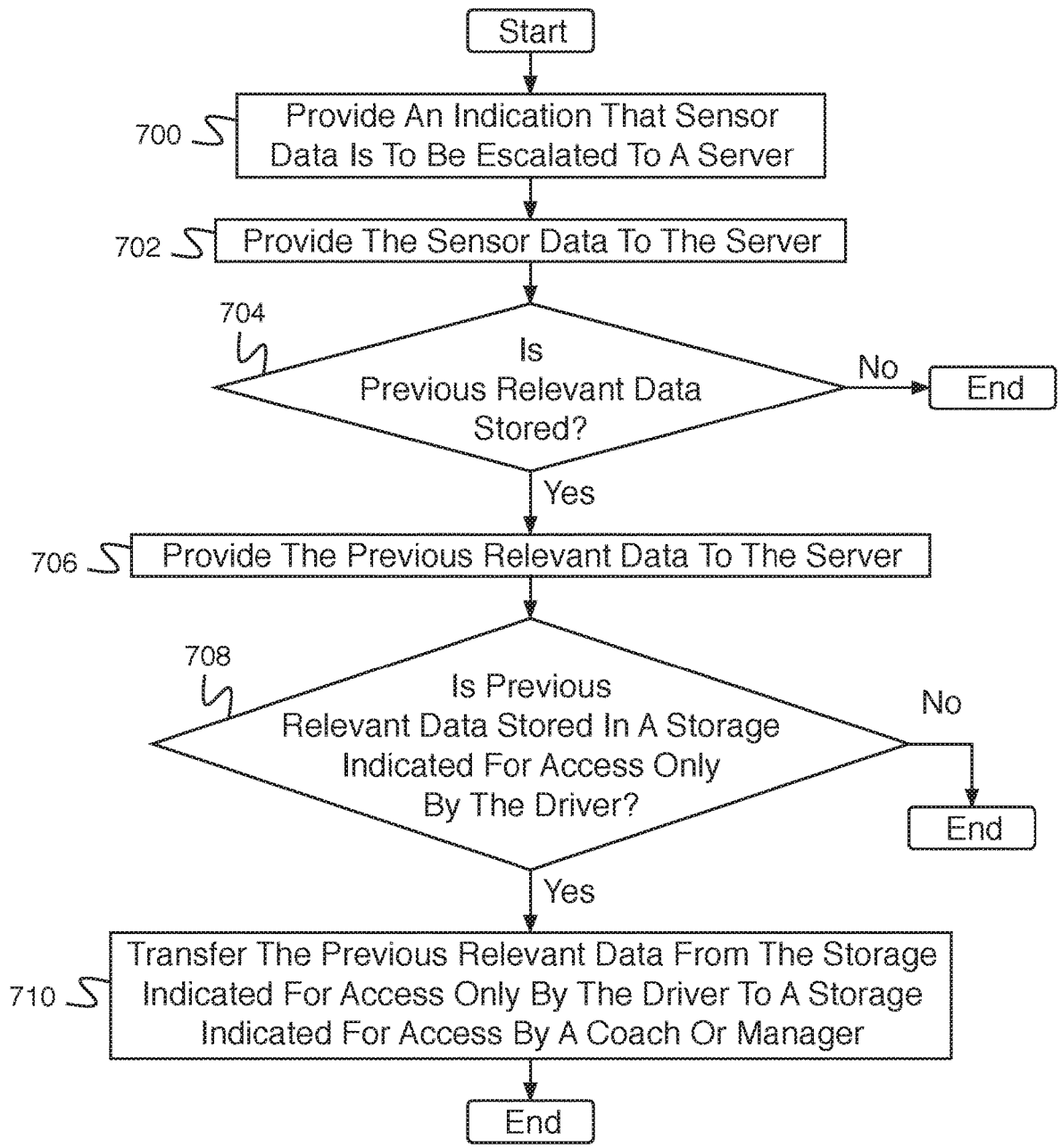
FIG. 7 is a flow diagram illustrating an embodiment of a process for indicating that sensor data is to be escalated to a server.

FIG. 7 is a flow diagram illustrating an embodiment of a process for indicating that sensor data is to be escalated to a server. In some embodiments, the process of FIG. 7 implements 608 of FIG. 6. In the example shown, in 700, an indication is provided that sensor data is to be escalated to a server. In 702, the sensor data is provided to the server. In 704, it is determined whether previous relevant data was stored. For example, previous relevant data comprises data associated with a previous event that is relevant to a current event. In the event it is determined that previous relevant data is not stored, the process ends. In the event it is determined that previous relevant data is stored, control passes to 706. In 706, the previous relevant data is provided to the server. In 708, it is determined whether previous relevant data is stored in a storage indicated for access only by the driver. In some embodiments, data stored indicated for access only by the driver is removed from storage in response to the driver associated with the data having stayed below a risk threshold for a period of time. In some embodiments, the data indicated for access only by the driver is released for review by the supervisor of the driver, the administrator of the system, or any other appropriate party in the event that the driver's risk score rises above a threshold or the behavior triggers an immediate release (e.g., a collision event trigger, a driver health condition, etc.). In the event it is determined that previous relevant data is not stored in a storage indicated for access only by the driver, the process ends. In the event it is determined that previous relevant data is stored in a storage indicated for access only be the driver, control passes to 710. In 710, the previous relevant data is transferred from the storage indicated for access only by the driver to a storage device indicated for access by a coach or manager.

Figure 8:
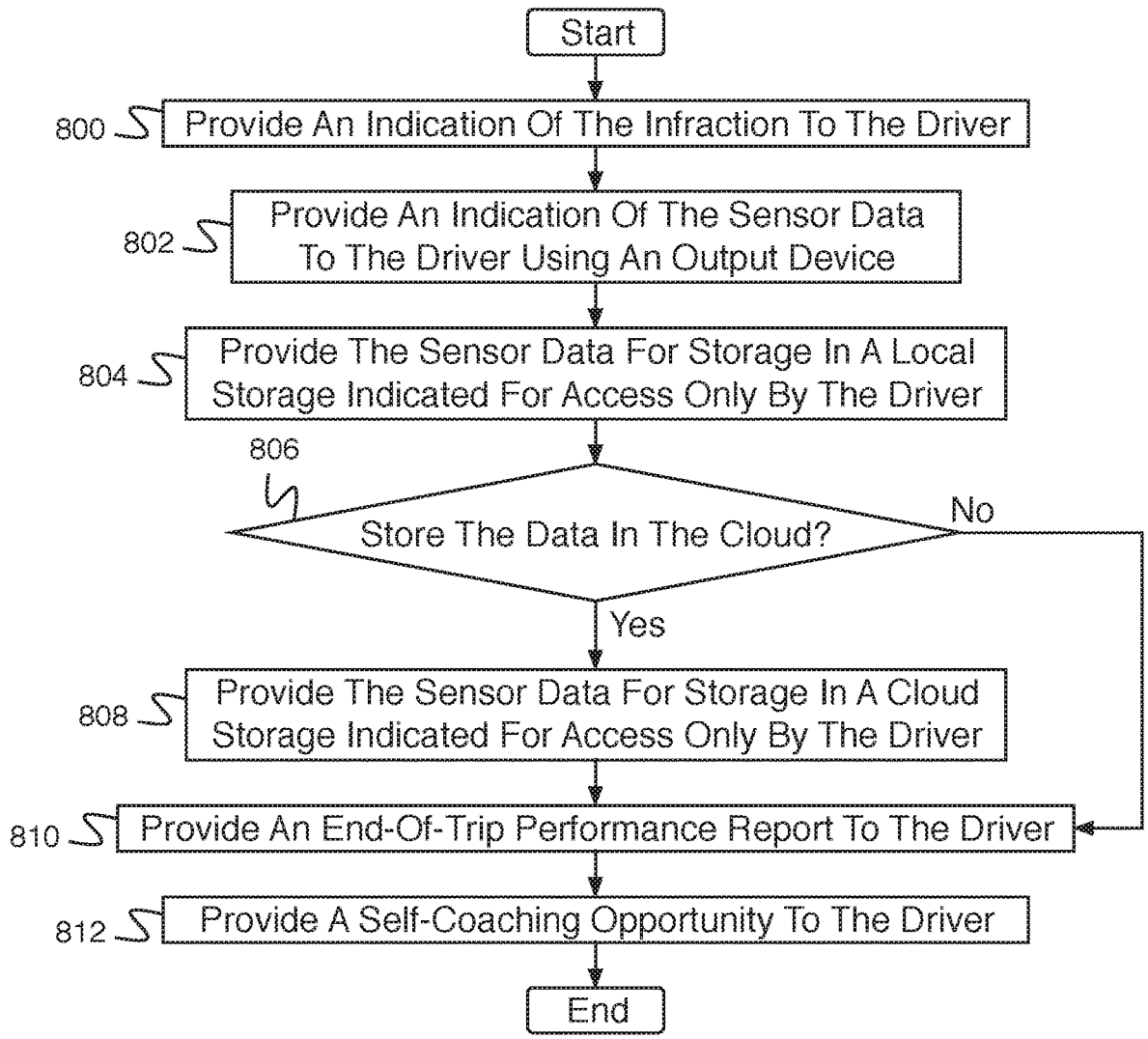
FIG. 8 is a flow diagram illustrating an embodiment of a process for indicating an infraction to a driver.

FIG. 8 is a flow diagram illustrating an embodiment of a process for indicating an infraction to a driver. In some embodiments, the process of FIG. 8 implements 606 of FIG. 6. In the example shown, in 800, an indication of the infraction is provided to the driver. For example, providing the indication of the infraction to the driver comprises providing immediate feedback to the driver. In 802, an indication of the sensor data (e.g., the sensor data indicating the infraction) is provided to the driver using an output device. For example, the indication of the sensor data is provided to the driver using an accessory device (e.g., accessory device 106 of FIG. 1), using an LED (e.g., a light emitting diode), using a speaker, using a display, using a phone, or using a tablet. In 804, the sensor data is provided for storage in a local storage indicated for access only by the driver. In 806, it is determined whether to store the data in the cloud. In the event it is determined to store the data in the cloud, control passes to 808. In 808, the sensor data is provided for storage in a cloud storage indicated for access only by the driver. Control then passes to 810. In 806, in the event it is determined not to store the data in the cloud, control passes to 810. In 810, an end-of-trip performance report is provided to the driver. In 812, a self-coaching opportunity is provided to the driver.

Figure 9:
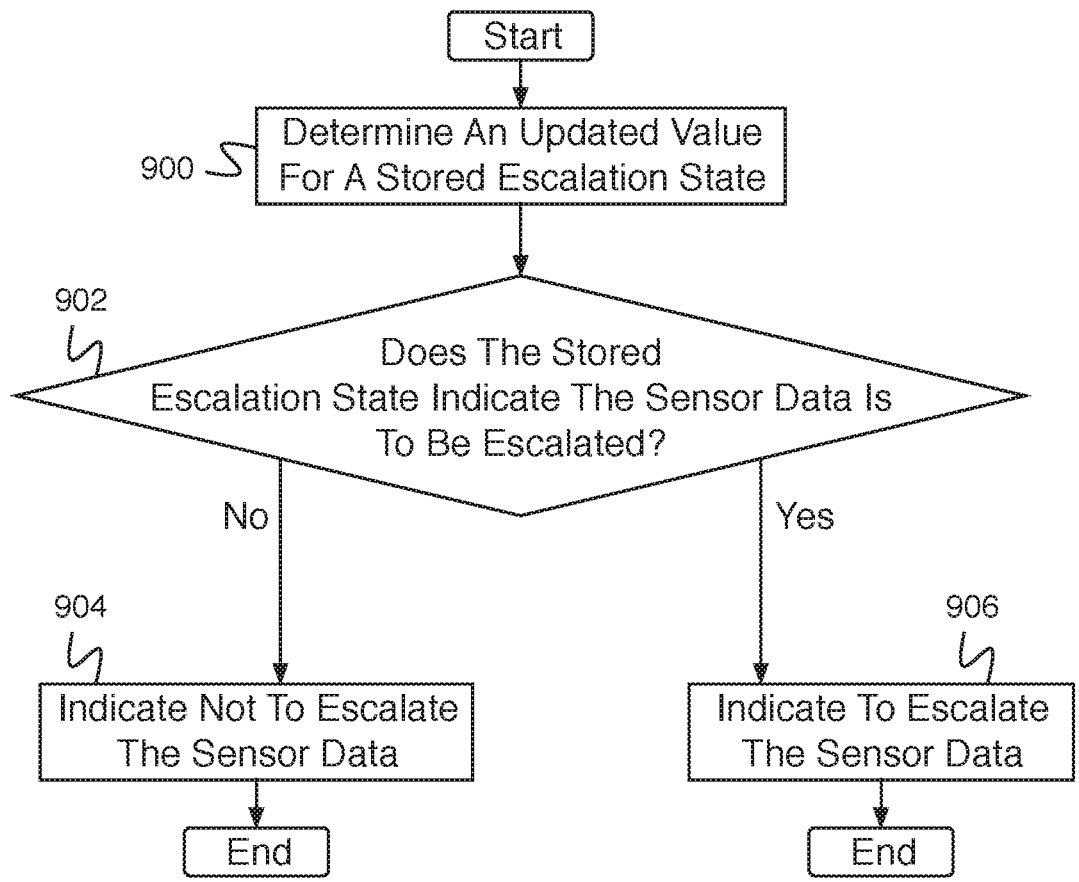
FIG. 9 is a flow diagram illustrating an embodiment of a process for determining whether to escalate sensor data.

FIG. 9 is a flow diagram illustrating an embodiment of a process for determining whether to escalate sensor data. In some embodiments, the process of FIG. 9 implements 604 of FIG. 6. In the example shown, in 900, an updated value for a stored escalation state is determined. In some embodiments, the stored escalation state comprises one of a plurality of stored escalation states, wherein each stored escalation state of the plurality of stored escalation states is associated with a risky behavior type. In some embodiments, the process of FIG. 9 is executed a plurality of times, once for each stored escalation state of the plurality of stored escalation states. For example, the risky behavior type comprises one of cellphone use, eating, drinking, general distraction, fatigue, no seat belt, following too close, lane keeping issues, not following a legal speed limit, not following a company policy speed limit, driving too fast for current conditions, performing a rolling stop, hard braking, hard acceleration, hard cornering, collision, roll stability, etc. In 902, it is determined whether the stored escalation state indicates that the sensor data is to be escalated. In the event that the stored escalation state indicates that the sensor data is not to be escalated, control passes to 904. In 904, the process indicates not to escalate the sensor data, and the process ends. In the event it is determined in 902 that the stored escalation state indicates the sensor data is to be escalated, control passes to 906. In 906, the process indicates to escalate the sensor data.

Figure 10:
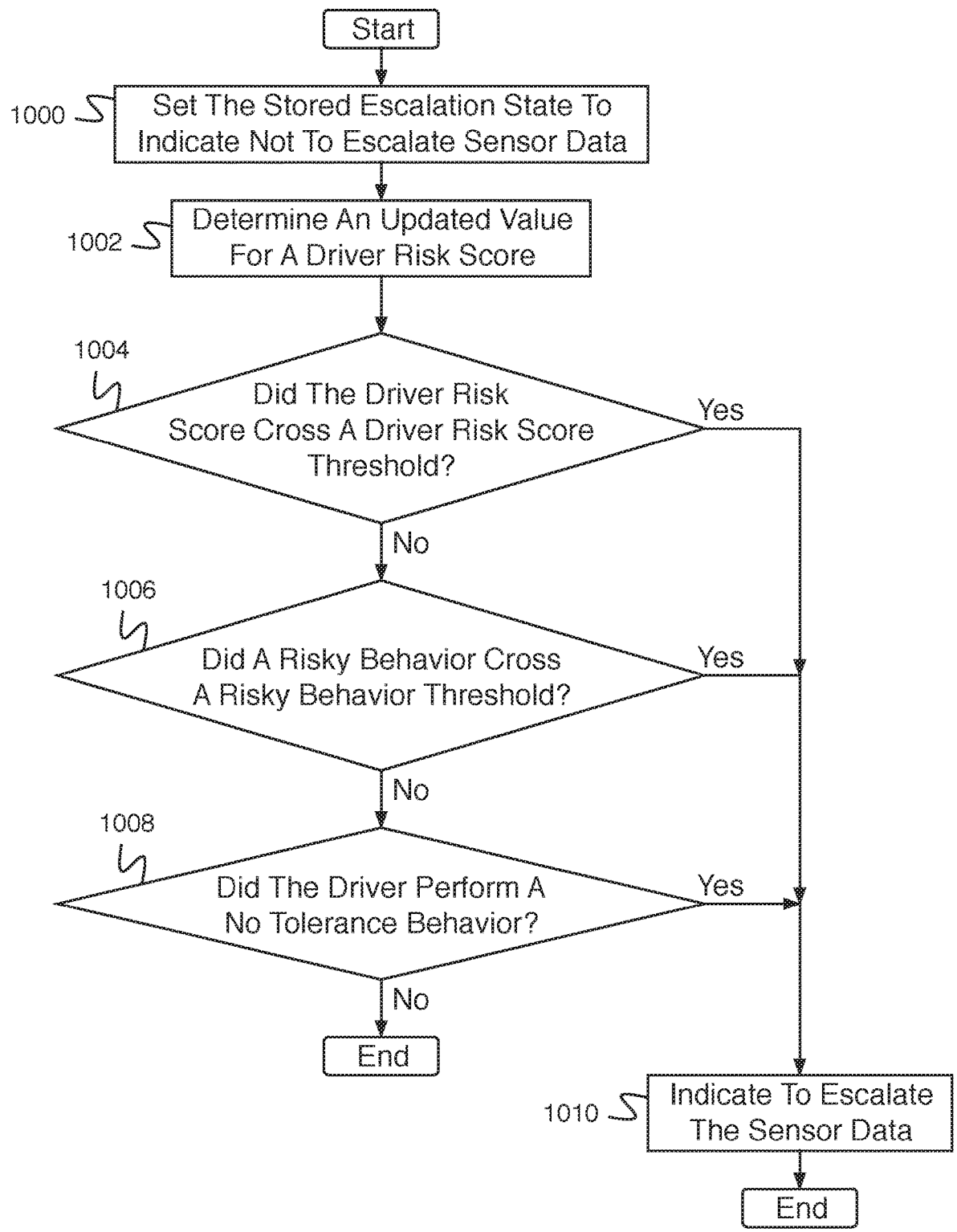
FIG. 10 is a flow diagram illustrating an embodiment of a process for determining an updated value for a stored escalation state.

FIG. 10 is a flow diagram illustrating an embodiment of a process for determining an updated value for a stored escalation state. In some embodiments, the process of FIG. 10 implements 900 of FIG. 9. In the example shown, in 1000, the stored escalation state is set to indicate not to escalate sensor data. For example, a default value of the stored escalation state comprises indicating not to escalate sensor data. In 1002, an updated value for a driver risk score is determined. In 1004, it is determined whether the driver risk score crossed a driver risk score threshold. For example, it is determined whether the driver risk score crossed a driver risk score threshold based at least in part on a risky behavior. For example, the risky behavior comprises a risky behavior determined from sensor data. In some embodiments, the risky behavior is determined from the sensor data using a model. In the event it is determined that the driver risk score crossed a driver risk score threshold, control passes to 1010. In the event it is determined that the driver risk score did not cross a driver risk score threshold, control passes to 1006. In 1006, it is determined whether a risky behavior crossed a risky behavior threshold. In the event it is determined that the risky behavior crossed the risky behavior threshold, control passes to 1010. In the event it is determined that a risky behavior did not cross a risky behavior threshold, control passes to 1008. In 1008, it is determined whether the driver performed a no tolerance behavior. In the event it is determined that the driver did not perform a no tolerance behavior, the process ends. In the event it is determined that the driver performed a no tolerance behavior, control passes to 1010. In 1010, the process indicates to escalate the sensor data.

Figure 11:
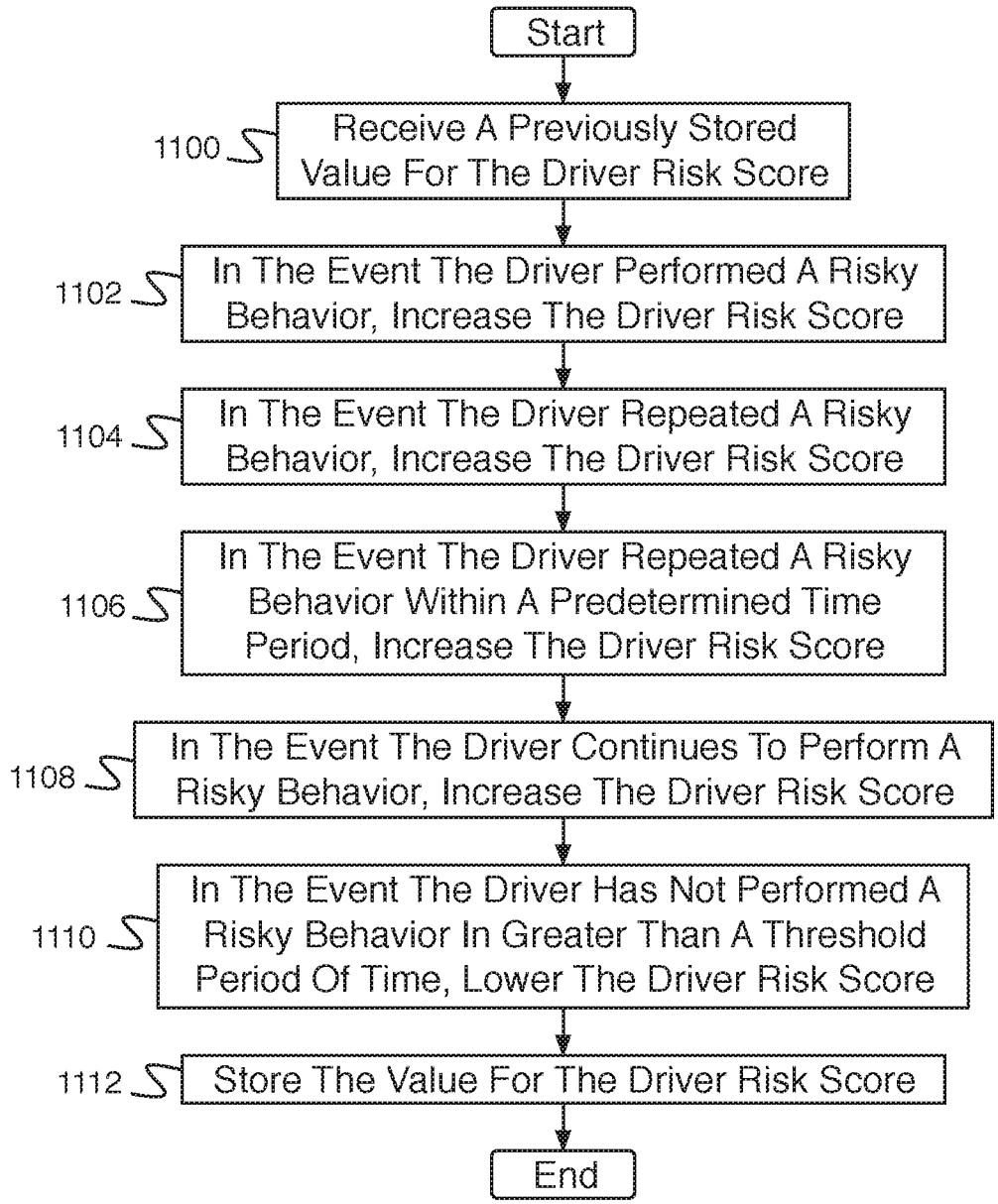
FIG. 11 is a flow diagram illustrating an embodiment of a process for determining an updated value for a driver risk score.

FIG. 11 is a flow diagram illustrating an embodiment of a process for determining an updated value for a driver risk score. In some embodiments, the process of FIG. 11 implements 1002 of FIG. 10. In the example shown, in 1100, a previously stored value for the driver risk score is received. In 1102, in the event the driver performed a risky behavior, the driver risk score is increased. In 1104, in the event the driver repeated a risky behavior, the driver risk score is increased. In 1106, in the event the driver repeated a risky behavior within a predetermined time period, the driver risk score is increased. In 1108, in the event the driver continues to perform a risky behavior, the driver risk score is increased. In 1110, in the event the driver has not performed a risk behavior in greater than a threshold period of time, the driver risk score is lowered. In 1112, the value for the driver risk score is stored. In some embodiments, the driver risk score is preserved from drive to drive for a driver. For example, the process is configured to, at the beginning of a drive, access driver records including a stored escalation state and/or a driver risk score stored on the server, and at the end of a drive, store driver records including stored escalation state and/or a driver risk score on the server.

FIG. 12 is a diagram illustrating an embodiment of self-managed risk details. In some embodiments, table 1200 illustrates details of self-managed risk for a vehicle event recorder (e.g., vehicle event recorder 102 of FIG. 1). In the example shown, table 1200 shows details for self-managed risk and not self-managed risk. In the example shown, risk is self-managed in the event that the client has the self-managed option enabled, the driver risk score is less than a risk threshold, and/or the identified risk is less than an escalation threshold. The escalation threshold can be implemented in a variety of methods, including an overall driver score, comprising the sum of risk values associated with driver behaviors, either evenly weighted or with assigned weights that decay over time; an incident driver score comprising the total score value of an incident including all identifiable risk conditions; and/or a condition that when satisfied, causes automatic escalation. Risk is not self-managed in the event that the client does not have the self-managed option enabled, the driver score is greater than the risk score, the identified risk exceeds the self-managed risk, and/or the automatic escalation condition is satisfied.

FIG. 13 is a diagram illustrating an embodiment of self-managed data management. In some embodiments, table 1300 illustrates details of self-managed data management for a vehicle event recorder (e.g., vehicle event recorder 102 of FIG. 1). In the example shown, in the event data is indicated to be self-managed and stored locally, self-managed data is maintained at the vehicle (e.g., by the vehicle event recorder); the driver is allowed to self-manage based on the system feedback; information is provided for escalation to a coach or manager in the event that driver behavior exceeds a self-managed risk threshold (e.g., data is moved from the vehicle to the cloud); and/or incident data expires at an appropriate interval in the event it is not escalated. In the event data is indicated to be self-managed and stored in the cloud, the same conditions apply except the data is moved into the cloud with self-manage tags to support limiting access control rights to the driver until escalation.

FIG. 14 is a diagram illustrating an embodiment of data examples. In some embodiments, table 1400 illustrates examples of data types for a vehicle event recorder (e.g., vehicle event recorder 102 of FIG. 1). In the example shown, incident meta data comprises, for example, incident type data, incident duration data, driver feedback type data, driver feedback count data, and/or driver response data. Incident video data comprises, for example, incident video data, video footage associated with a predefined incident, and/or video comprising part of a continual recording indexed by incident meta data.

FIG. 15 is a diagram illustrating an embodiment of data access examples. In some embodiments, table 1500 illustrates data access examples for a vehicle event recorder (e.g., vehicle event recorder 102 of FIG. 1). In the example shown, for a driver accessing self-managed data, data access is provided to the driver as it is available, the data is read-only, and/or the driver can flag the data for deletion in the event they feel it is inaccurate. For a coach or manager accessing self-managed data, no standard access is provided, however, the coach or manager can access the data in the event it is escalated or access is granted by the driver. Condition based access is additionally provided to the coach or manager—for example, in the event of escalation conditions that weren't automatically invoked (e.g., a misclassified collision) or in the event a driver flags an infraction for deletion. For example, data escalations invoked after the fact require specific access rights (e.g., limited to senior management), and additional risk modifications will be logged and/or traceable.

FIG. 16 is a diagram illustrating an embodiment of a self-managed data situation and escalation criteria for varied risk types. In some embodiments, table 1600 illustrates a self-managed data situation and escalation criteria for varied risk types for a vehicle event recorder (e.g., vehicle event recorder 102 of FIG. 1). In the example shown, for a distraction—cellphone risk type, the driver is alerted 4 seconds after initial detection of the risk, and re-alerted 6 seconds after initial detection of the risk. The behavior is escalated upon re-alerting or continuous behavior for greater than or equal to 6 seconds, or the driver having more than one incident on a single drive. For a distraction-eating/drinking risk type, the driver is alerted 10 seconds after initial detection of the risk, and re-alerted 12 seconds after initial detection of the risk. The behavior is escalated upon re-alerting or continuous behavior for greater than or equal to 12 seconds, or the driver having more than one incident on a single drive. For a distraction—smoking risk type, the driver is alerted 4 seconds after initial detection of the risk, and re-alerted 10 seconds after initial detection of the risk. The behavior is escalated upon re-alerting or continuous behavior for greater than or equal to 10 seconds, or the driver having more than one incident on a single drive. For a general distraction risk type, the driver is alerted 4 seconds after initial detection of the risk, and re-alerted 6 seconds after initial detection of the risk. The behavior is escalated upon re-alerting or continuous behavior for greater than or equal to 6 seconds, or the driver having more than one incident on a single drive. For a fatigue risk type, the driver is alerted 4 seconds after initial detection of the risk, and re-alerted 6 seconds after initial detection of the risk. The behavior is escalated upon re-alerting or continuous behavior for greater than or equal to 6 seconds, or the driver having more than one incident within a rolling 7 day window. For a no seat belt risk type, the driver is alerted 30 seconds after initial detection of the risk, and re-alerted 40 seconds after initial detection of the risk. The behavior is escalated upon re-alerting or continuous behavior for greater than or equal to 40 seconds, or the driver having more than one incident within a rolling 7 day window. For a following too close risk type, the driver is alerted 4 seconds after initial detection of the risk, and re-alerted 6 seconds after initial detection of the risk. The behavior is escalated upon re-alerting or continuous behavior for greater than or equal to 6 seconds, or the driver having more than one incident within a single drive.

FIG. 17 is a diagram illustrating an embodiment of a self-managed data situation and escalation criteria for varied risk types. In some embodiments, table 1700 comprises a continuation of table 1600 of FIG. 16 for additional risk types. In the example shown, for a lane keeping violation risk type, the driver is alerted after 2 or more lane departures within 10 seconds. The behavior is escalated upon more than 2 violations within a rolling 7 day window. For a posted speed limit infraction (for example, driving more than 10 miles per hour above a posted speed limit), the driver is alerted 4 seconds after initial detection of the risk, and re-alerted 10 seconds after initial detection of the risk. The behavior is escalated upon re-alerting or continuous behavior for greater than or equal to 10 seconds, or the driver having more than one incident on a single drive. For a company policy speed limit infraction (for example, driving more than 5 miles per hour above a company policy speed limit), the driver is alerted 4 seconds after initial detection of the risk, and re-alerted 10 seconds after initial detection of the risk. The behavior is escalated upon re-alerting or continuous behavior for greater than or equal to 10 seconds, or the driver having more than one incident on a single drive. For a driving too fast for road conditions infraction, the driver is alerted 4 seconds after initial detection of the risk, and re-alerted 10 seconds after initial detection of the risk. The behavior is escalated upon re-alerting or continuous behavior for greater than or equal to 10 seconds, or the driver having more than one incident on a single drive. For a rolling stop violation risk type, the driver is alerted after detection of the rolling stop violation. The behavior is escalated upon the driver having more than one incident within a rolling 7 day window. For a hard brake violation risk type, the driver is alerted after detection of the hard brake violation. The behavior is escalated upon the driver having more than one incident within a rolling 7 day window. For a hard acceleration violation risk type, the driver is alerted after detection of the hard acceleration violation. The behavior is escalated upon the driver having more than one incident within a rolling 7 day window. For a hard corner violation risk type, the driver is alerted after detection of the hard corner violation. The behavior is escalated upon the driver having more than one incident within a rolling 7 day window. For a collision or a roll stability risk type, the incident is never self-managed and is escalated immediately.

In some embodiments, the driver is alerted after a first period of time and re-alerted after a second period of time. In some embodiments, the behavior of the driver is escalated after a third period of time or under a condition (e.g., number of incidents within a time window, number of incidents over a trip greater than a threshold, number of incidents above a threshold, any incidence, on re-alerting or continuous behavior above a threshold time limit, or any other appropriate condition).

In some embodiments, a self-managed data situation and escalation criteria comprises: a non-safety use cases. For example, using phone in cab for greater than X minutes (e.g., where X minutes comprises an integer number of minutes—for example, five minutes) when driver is supposed to be unloading goods, which is escalated in response to doing this greater than one time during one delivery route. In this example, driver is alerted after N minutes of phone use in the cab and again after M minutes (e.g., the driver is alerted after 3 minutes and then again after 4 minutes). The driver is further indicated that the incident is escalated after X minutes and indicated again of escalation after X+Y minutes (e.g., escalated after 5 minutes and again after 5+2 minutes).

In some embodiments, a self-managed data situation and escalation criteria comprises a fuel efficiency case. For example, drivers are alerted to patterns of inefficient driving that result in fuel waste (e.g., highway gear selection, speeding, aggressive driving, etc.). In this case, a driver is alerted on each incident. The driver receives indication that the incident is escalated when the fuel waste exceeds X % of ideal consumption (e.g., when fuel waste exceeds 1%, 5%, 10%, etc.). As another example, drivers are alerted when idling for Y minutes (e.g., idling for 4 minutes, 10 minutes, etc.). The driver receives indication that the incident is escalated when idle time exceeds Z minutes or driver receives >W idle warning within a trip (e.g., escalated when idle time exceed 10 minutes, 15 minutes, etc. or >1 idle warning within a trip or during one day).

In some embodiments, a self-managed data situation and escalation criteria comprises a route compliance case. For example, driver compliance to the dispatched routes are monitored and a driver receives an alert when their route deviation results >X minute delay or greater than a Y % delay of the overall route time (e.g., greater than a 10 minute delay or greater than a 5% delay of the overall route time). The driver receives indication that the incident is escalated when route deviation results in >Z minute delay or driver receives >M route deviation delay alert within a trip or within a time period (e.g., the route deviation results in a >15 minute delay or >1 route deviation delay alert within a trip or in a day).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for data escalation, comprising:
an interface configured to:
receive sensor data; and
a processor configured to:
determine that the sensor data indicates an infraction by a driver;
determine whether a risk associated with the infraction satisfies a predetermined escalation criteria; and
in response to a determination that the risk associated with the infraction does not satisfy the predetermined escalation criteria:
indicate the infraction to the driver; and
store the sensor data in a data storage region indicated for access only to the driver,
wherein the processor is further configured to remove the sensor data from the data storage region indicated for access only to the driver in response to the driver staying below a risk threshold for a predetermined period of time.

2. The system of claim 1, wherein the sensor data comprises incident data, incident metadata, incident video data, incident audio data, or driver identifier data.

3. The system of claim 1, wherein a cloud storage comprises the data storage region.

4. The system of claim 1, wherein the data storage region is a first data storage region, and wherein the processor is further configured to, in response to the determination that the risk associated with the infraction satisfies the predetermined escalation criteria:
  indicate the infraction to the driver; and
  escalate the sensor data, wherein escalating the sensor data comprises storing the sensor data in a second data region indicated for access by a coach or a manager.

5. The system of claim 4, wherein escalating the sensor data comprises transferring the sensor data from the first storage region to the second storage region.

6. The system of claim 1, wherein indicating the infraction to the driver comprises providing an indication of the sensor data to the driver using an output device.

7. The system of claim 1, wherein indicating the infraction to the driver comprises providing immediate feedback to the driver, providing an end-of-trip performance report to the driver, or providing a self-coaching opportunity to the driver.

8. The system of claim 1, wherein the predetermined escalation criteria comprises a stored escalation state.

9. The system of claim 8, wherein the stored escalation state indicates by default not to escalate the sensor data.

10. The system of claim 8, wherein the stored escalation state is updated to indicate to escalate the sensor data in response to a driver risk score crossing a driver risk score threshold based at least in part on a risky behavior.

11. The system of claim 10, wherein the driver is notified that the stored escalation state is updated to indicate to escalate the sensor data.

12. The system of claim 10, wherein the driver risk score is increased in response to one or more of the following: the driver repeating the risky behavior, the driver repeating the risky behavior within a predetermined time period, and/or the driver continuing to perform the risky behavior.

13. The system of claim 10, wherein the driver risk score is lowered in response to the driver not performing the risky behavior for a threshold period of time.

14. The system of claim 8, wherein the stored escalation state is updated to indicate one or more of the following: to escalate the sensor data in response to a risky behavior crossing a risky behavior threshold and/or to escalate the sensor data in response to a no tolerance behavior.

15. The system of claim 8, wherein the stored escalation state indicates by default to escalate the sensor data.

16. The system of claim 8, wherein the stored escalation state comprises one of a plurality of stored escalation states, wherein each stored escalation state of the plurality of stored escalation states is associated with a risky behavior type.

17. The system of claim 16, wherein the risky behavior type comprises one of cellphone use, eating, drinking, general distraction, fatigue, no seat belt, following too close, lane keeping issues, not following a legal speed limit, not following a company policy speed limit, driving too fast for current conditions, performing a rolling stop, hard braking, hard acceleration, hard cornering, collision, or roll stability.

18. The system of claim 1, wherein the sensor data is stored on a vehicle event recorder mounted on a vehicle.

19. A method for data escalation comprising:
  receiving sensor data;
  determining, using a processor, that the sensor data indicates an infraction by a driver;
  determining whether a risk associated with the infraction satisfies a predetermined escalation criteria; and
  in response to a determination that the risk associated with the infraction does not satisfy the predetermined escalation criteria:
    indicating the infraction to the driver; and
    storing the sensor data in a data storage region indicated for access only to the driver,
  wherein the processor is further configured to remove the sensor data from the data storage region indicated for access only to the driver in response to the driver staying below a risk threshold for a predetermined period of time.

20. A non-transitory computer readable storage medium embodying a computer program product for data escalation, the computer program product comprising computer instructions for:
  receiving sensor data;
  determining that the sensor data indicates an infraction by a driver;
  determining whether a risk associated with the infraction satisfies a predetermined escalation criteria; and
  in response to a determination that the risk associated with the infraction does not satisfy the predetermined escalation criteria:
    indicating the infraction to the driver; and
    storing the sensor data in a data storage region indicated for access only to the driver,
  wherein the sensor data is removed from the data storage region indicated for access only to the driver in response to the driver staying below a risk threshold for a predetermined period of time.

* * * * *